United States Patent Office

3,502,652
Patented Mar. 24, 1970

3,502,652
BASICALLY SUBSTITUTED BENZOIC
ACID AMIDES
Ernst Jucker, Ettingen, and John Gmünder, Muttenz,
Switzerland, assignors to Sandoz Ltd. (also known as
Sandoz A.G.), Basel, Switzerland
No Drawing. Filed Jan. 17, 1966, Ser. No. 520,847
Claims priority, application Switzerland, Jan. 19, 1965,
734/65; Apr. 6, 1965, 4,769/65
Int. Cl. C07d 51/74, 53/00
U.S. Cl. 260—239                                 13 Claims

ABSTRACT OF THE DISCLOSURE

This application relates to new benzoic acid amides of the formula:

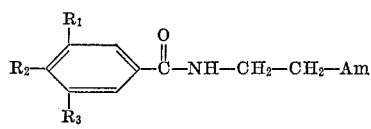

in which Am is 1-pyrrolidinyl, piperidino, 2,6-dimethylpiperidino, 9-aza-9-bicyclo[3,3,1]nonyl, morpholino, 4-methyl-1-piperazinyl or 5-methyl-octahydro-1,5-diazocin-(1)-yl, and either
(i) one of $R_1$, $R_2$ and $R_3$ is hydrogen, the second is hydrogen, fluorine, chlorine or methyl, and the third is sulphamoyl or nitro, or
(ii) one of $R_1$, $R_2$ and $R_3$ is hydrogen, and each of the remaining two is chlorine,
and physiologically acceptable acid addition salts thereof.

---

The present invention relates to new benzoic acid amides with basic substituents and to a process for their manufacture.

The present invention provides compounds of Formula 1,

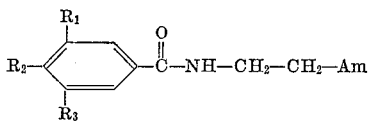

in which Am signifies the 1-pyrrolidinyl, piperidino, 2,6-dimethylpiperidino, 9-aza-9-bicyclo[3,3,1]nonyl, morpholino, 4-methyl-1-piperazinyl or 5-methyl-octahydro-1,5-diazocin-(1)-yl radical, and either
(i) one of the symbols $R_1$, $R_2$ and $R_3$ signifies a hydrogen atom, the second symbol signifies a hydrogen, fluorine or chlorine atom, or a methyl radical, the third symbol signifies a sulphamoyl or nitro radical, or
(ii) one of the symbols $R_1$, $R_2$ and $R_3$ signifies a hydrogen atom and each of the remaining two symbols signifies a chlorine atom,
and their acid addition salts.

The present invention further provides a process for the production of the compounds of Formula I and their acid addition salts, characterized in that an ethylenediamine of Formula II, $$H_2N-CH_2-CH_2-Am \qquad (II)$$

in which Am has the above significance,
is acylated with a benzoyl halide of Formula III,

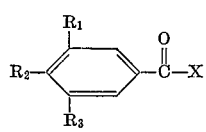

in which
$R_1$, $R_2$ and $R_3$ have the above significance, and
X signifies a chlorine or bromine atom, and—when the free base is required—this is obtained by liberating it from the resulting hydrogen halide, and—when an acid addition salt is required—the free base is reacted with an inorganic or organic acid. The acylation should preferably be effected in the presence of an acid binding agent but it should be noted that some of the starting materials themselves fulfill this role as is explained more fully below.

Suitable ethylenediamines of Formula II for use in the process of the invention are, for example: 2-piperidino-ethylamine, 2-(2,6-dimethyl-piperidino)-ethylamine or 2-(9-aza-9-bicyclo[3,3,1]nonyl)-ethylamine; examples of suitable benzoyl halides of Formula III are: 3,4-dichlorobenzoyl chloride, 4-chloro-3-sulphamoyl-benzoyl chloride and 4-fluoro-3-sulphamoyl-benzoyl chloride.

One method of effecting the process of the invention is as follows:

A solution of a benzoyl halide of Formula III, preferably the chloride, in an inert organic solvent, e.g. methylene chloride, carbon tetrachloride, acetone, benzene or toluene (preferably chloroform), is added dropwise at 0–20° C. whilst stirring to a solution of an ethylene-diamine of Formula II in more of the same solvent. Those of the benzoyl halides which are sparingly soluble, e.g. 4-chloro-3-sulphamoyl-benzoyl chloride, in powder form are added portionwise; alternatively, they are suspended in one of the above solvents, whereupon a solution of the ethylenediamine of Formula II in more of the same solvent is added dropwise to the resulting suspension. In order to complete the reaction the acylation mixture is further stirred for several hours, e.g. for 18 to 48 hours, and is then optionally heated at reflux for a short time, e.g. one hour, whereupon the resulting final product may be isolated and purified as the free base or in the form of an acid addition salt in manner known per se.

It is often favourable to effect the acylation in the presence of an acid binding agent, e.g. a tertiary organic base, preferably triethylamine; however, an acid binding agent usually need not be specially added as the ethylene-diamine of Formula II used as starting material contains a teritary amino radical in addition to the primary amino radical to be acylated; this tertiary amino radical is capable of binding the halogen hydracid liberated during the reaction.

The compound of Formula I may be liberated from the hydrogen halide obtained in accordance with the above acylation in the usual manner, e.g. by treating with dilute ammonia, an aqueous alkali or an anion exchange resin which has been activated with an alkali. The free base may subsequently be reacted with an inorganic or organic acid to the corresponding salt, the production of which forms part of the present invention. Examples of acids for acid addition salt formation are: hydrochloric, hydrobromic, sulphuric, fumaric, malonic, tartaric, methanesulphonic or p-toluenesulphonic acid.

The compounds of Formula I, especially N-[2-(1-pyrrolidinyl)-ethyl]- and N-[2-(9-aza-9-bicyclo[3,3,1] nonyl) - ethyl] - 4-chloro-3-sulphamoyl-benzamide, are characterized by valuable pharmacodynamic properties. Thus, they have a pronounced antihypertensive effect which sets in slowly and lasts several hours; this effect is also produced when the compounds are administered perorally. The toxicity of the compounds is very low; for example, the $LD_{50}$ for some compounds of Formula I is more than 1 g./kg. body weight of test animals when administered orally. The compounds of Formula I are therefore indicated for use in the treatment of hypertonia, it being preferred to administer them in the form of their water soluble, physiologically acceptable salts. A suitable average daily dose of compounds of Formula I is 20 to 500 mg.

The compounds of Formula I may be used as pharmaceuticals on their own or in the form of suitable medicinal preparations for administration, e.g. enterally or parenterally. In order to produce suitable medicinal preparations the compounds are worked up with organic or inorganic adjuvants which are inert and physiologically acceptable. Examples of such adjuvants are:

for tablets and dragées: lactose, starch, talc and stearic acid;
for injectable solutions: water, alcohols, glycerin and vegetable oils.

The preparations may furthermore contain suitable preserving, stabilizing and wetting agents, solubilizers, sweetening and colouring substances and flavorings.

The present invention thus further provides pharmaceutical compositions containing, in addition to a physiologically acceptable carrier, a compound for Formula I and/or a physiologically acceptable acid addition salt thereof.

Those of the ethylenediamines of Formula II used as starting materials, which are unknown, may, for example, be produced as follows:

(i) A heterocyclic secondary amine of the formula H—Am, in which Am has the above significance, e.g. 2,6-dimethyl-piperidine or 9-azabicyclo-[3,3,1]nonane, is hydroxyethylated with ethylene oxide, the resulting compound is converted into a derivative of Formula IV.

$$Y-CH_2-CH_2-AM \qquad (IV)$$

in which

Am has the about significance, and
Y signifies a reactive acid radical, preferably chlorine, bromine, or a sulphonic acid radical, e.g. the benzene, p-bromobenzene- or p-toluenesulphonic acid radical, with thionyl chloride, phosphorus trichloride, phosphorus tribromide or benzene-, p-bromobenzene- or p-toluene-sulpho-chloride and the resulting compound of Formula IV is reacted with an excess of ammonia.

(ii) Another possibility consists in reduction, e.g. with a complex alkali metal hydride, of a compound of Formula V, $$H_2N-C-CH_2-Am \qquad (V)$$
$$\phantom{H_2N-C}\|\phantom{CH_2-Am}$$
$$\phantom{H_2N-C}O$$

in which Am has the above significance, or a compound of Formula VI, $$N\equiv C-CH_2-Am \qquad (VI)$$

in which Am has the above significance, which may be obtained from a heterocyclic amine of the Formula H—Am by reacting with a derivative of acetamide, e.g. chloro- or bromo- acetamide, or of the acetonitrile, e.g. chloro- or bromo-acetonitrile, in the presence of an acid binding agent; compounds of Formula VI may be produced from amines of the Formula H—Am by reacting with potassium cyanide and formaldehyde.

Some of the benzoyl halides of Formula III are known; those which are unknown may be obtained from the correspondingly substituted benzoic acids by the usual reaction with a suitable halogenating agent, e.g. thionyl chloride, phosphorus pentachloride or phosphorus tribromide. Some of these last mentioned benzoic acids, however, have hitherto not been described in the literature on the subject; they may be produced from known compounds, for example, as follows:- 3-fluoro-5-nitro-, 3-fluoro-4-sulphamoyl- and 3-fluoro-5-sulphamoyl-benzoic acid are obtained by oxidation, e.g. with chromium troxide in glacial acetic acid or potassium permanganate in alkaline solution, of the correspondingly disubstituted toluenes, which are known with the exception of the two fluoro-sulphamoyl derivatives. These fluoro-sulphamoyl derivatives may be obtained from 3-fluoro-p-toluidine or 3-fluoro-m-toluidine (produced by reduction of 3-fluoro-5-nitrotoluene) as follows: Diazotization is effected, the diazonium salt is reacted with sulphur dioxide and copper-(I)-chloride and the resulting chlorosulphonyl derivative is converted into the desired sulphamide with ammonia. 3-methyl-5-sulphamoyl-benzoic acid is produced in that the corresponding methyl-sulpho-benzoic acid is reacted with phosphorus pentachloride, the resulting dichloride is hydrolysed to give 3-methyl-5-chloro-sulphonyl-benzoic acid and this is treated with ammonia.

In the following non-limitative Examples all temperatures are indicated in degrees centigrade. The melting and boiling points are uncorrected.

EXAMPLE 1

N-(2-piperidinoethyl)-3,4-dichloro-benzamide

A solution of 15.2 g. of 3,4-dichloro-benzolylchloride in 40 ml. of chloroform is added dropwise at 0–10° whilst stirring to a solution of 9.3 g. of 2-piperidino-ethylamine and 7.5 g. of triethylamine in 40 ml. of chloroform. Stirring is effected at room temperature for a further 48 hours, the reaction mixture is exhaustively extracted with water and the organic phase which has been dried over magnesium sulphate is evaporated at reduced pressure. The resulting residue is dissolved in 35 ml. of ethanol and an excess of a solution of hydrochloric acid in ether is added thereto, whereby the hydrocloride of N-(2-piperidinoethyl)-3,4-dichloro-benzamide precipitates and is separated and recrystallized from isopropanol. Melting point 220–222°.

EXAMPLE 2

N-(2-piperidinoethyl)-4-chloro-3-sulphamoyl-benzamide 18.5 g. of 4-chloro-3-sulphamoyl-benzoyl-chloride are added portionwise whilst stirring at 0–10° to a solution of 9.3 g. of 2-piperidino-ethylamine and 7.5 g. of triethylamine in 75 ml. of chloroform and the process is then continued in a manner analogous to that described in Example 1. Melting point of the hydrochloride 174–176° (from methanol).

EXAMPLE 3

N-[2-(1-pyrrolidinyl)-ethyl]-4-chloro-3-sulphamoyl-benzamide 18.5 g. of 4-chloro-3-sulphamoyl-benzoyl-chloride are added portionwise whilst stirring at 0–5° to a solution of 8.3 g. of 2-(1-pyrrolidinyl)-ethylamine in 80 ml. of chloroform and the reaction mixture is subsequently stirred at room temperature for a further 20 hours. The insoluble hydrochloride of the desire compound is filtered off and recrystallized from methanol. Melting point 196–198°.

EXAMPLE 4

N-(2-morpholinoethyl)-4-chloro-3-sulphamoyl-benzamide

This compound is obtained in a manner analogous to that described in Example 3, but 10.0 g. of 2-morpholino-ethylamine and 19.6 g. of 4-chloro-3-sulphamoyl-benzoyl-chloride are used as starting materials. Melting point of the hydrochloride 221–223°, from methanol/water.

EXAMPLE 5

N-[2-(9-aza-9-bicyclo[3,3,1]nonyl)-ethyl]-4-chloro-3-sulphamoyl-benzamide

This compound is obtained in a manner analogous to that described in Example 3, but 13.4 g. of 2-(9-aza-9-bicyclo[3,3,1]nonyl)-ethylamine and 20.2 g. of 4-chloro-3-sulphamoyl-benzoyl-chloride are used as starting materials. Melting point of the hydrochloride 267–269° (decomposition) from water.

The 2-(9-aza-9-bicyclo[3,3,1]nonyl)-ethylamine used as starting material is produced as follows:

21.2 g. of anhydrous sodium carbonate and subsequently a solution of 25.0 g. of 9-aza-bicyclo[3,3,1]nonane in 100 ml. of acetone are added whilst stirring to a solution of 18.7 g. of chloroacetamide in 100 ml. of acetone. Heating at reflux is effected for 16 hours whilst stirring, the solution is filtered whilst hot and the separated percipitate is washed with 150 ml. of hot acetone. The filtrate is evaporated to dryness at reduced pressure, whereby (9-aza-9-bicyclo[3,3,1]nonyl)-acetamide results; melting point 129–131°, from acetone.

A solution of 31.8 g. of (9-aza-9-bicyclo[3,3,1]nonyl)-acetamide in 200 ml. of absolute tetrahydrofuran is added dropwise whilst stirring at 0–10° to 8.3 g. of lithium aluminium hydride in 150 ml. of absolute tetrahydrofuran. The reaction mixture is stirred at 0° for a further hour, is subsequently heated at reflux for 20 hours, is again cooled to 0° in an ice bath and 30 ml. of water are carefully added dropwise whilst stirring vigorously. After one hour an excess of solid potassium hydroxide is added, whereupon the organic phase is separated by filtration. The residue remaining after evaporation of the solvent is fractionated in a vacuum, whereby 2-(9-aza-9-bicyclo[3,3,1]nonyl-ethylamine distils at 135–145°/12 mm. of Hg.

EXAMPLE 6

N-(2-piperidinoethyl)-4-sulphamoyl-benzamide

This compound is obtained in a manner analogous to that described in Example 3, but 6.4 g. of 2-piperidino-ethylamine and 11.0 g. of 4-sulphamoyl-benzoyl-chloride are used as starting materials. Melting point of the hydrochloride 211–213° (from methanol, after treatment with active charcoal).

EXAMPLE 7

N-[2-(2,6-dimethylpiperidino)-ethyl]-4-chloro-3-sulphamoyl-benzamide

This compound is obtained in a manner analogous to that described in Example 3, but 15.6 g. of 2-(2,6-dimethylpiperidino)-ethylamine and 25.4 g. of 4-chloro-3-sulphamoyl-benzoyl-chloride are used as starting materials. Melting point of the hydrochloride 235–240° (from methanol).

The 2-(2,6-dimethylpiperidino)-ethylamine used as starting material is produced as follows:

135.6 g. of 2,6-dimethylpiperidine are heated to 220° in a steel autoclave for 3 hours together with 60 ml. of ethylene oxide and 6 ml. of water. The reaction mixture is subsequently distilled, whereby 1-(2-hydroxy-ethyl)-2,6-dimethylpiperidine distils between 107° and 110° and 14 mm. of Hg as a colourless oil.

180 g. of 1-(2-hydroxyethyl)-2,6-dimethylpiperidine are added whilst stirring and cooling well with ice to 340 ml. of thionyl chloride, whereby a strong gas evolution occurs. Stirring is continued over night at room temperature, heating is effected at reflux for 2 hours and the excess thionyl chloride is subsequently distilled off at normal pressure. The residue is boiled with 500 ml. of ethanol, the resulting solution is treated with active charcoal and reduced in volume until the hydrochloride of 1-(2-chloroethyl)-2,6-dimethylpiperidine commences to precipitate. Melting point 181–183° (from acetone).

40 g. of the hydrochloride obtained above and approximately 150 ml. of liquid ammonia are kept in a bomb tube at room temperature for 16 hours and at 80° for 2 hours. An excess of a 50% potassium hydroxide solution is added to the residue remaining after evaporation of the excess ammonia and the resulting base is exhaustively extracted with ether. After evaporating the ether distillation is effected at 14 mm. of Hg, whereby 2-(2,6-dimethyl-piperidino)-ethylamine distils between 125° and 135°.

EXAMPLE 8

N-(2-piperidinoethyl)-4-chloro-3-nitro-benzamide

A total of 11.0 g. of 4-chloro-3-nitro-benzoyl-chloride is added portionwise during the course of half an hour, whilst stirring and cooling with ice to a solution of 6.4 g. of 2-piperidino-ethylamine in 80 ml. of chloroform and the reaction mixture is subsequently stirred at room temperature for a further 60 hours. The difficulty soluble hydrochloride is separated by filtration and recrystallized from methanol for purification. Melting point 194–195°.

The following compounds are produced in an analogous manner:

EXAMPLE 9

N-(2-piperidinoethyl)-4-methyl-3-sulphamoyl-benzamide

Melting point of the hydrochloride 220–223°, after crystallization from ethanol/water.

EXAMPLE 10

N-(2-piperidinoethyl)-4-fluoro-3-sulphamoyl-benzamide

Double melting point of the hydrochloride 124°/207–210°, after crystallization from methanol.

EXAMPLE 11

N-[2-(4-methyl-1-piperazinyl)-ethyl]-4-chloro-3-sulphamoyl-benzamide

Melting point of the hydrochloride 290–292°, after crystallization from aqueous isopropanol.

EXAMPLE 12

N-[2-(5-methyl-octahydro-1,5-diazocin-1-yl)-ethyl]-4-chloro-3-sulphamoyl-benzamide Melting point of the hydrochloride 278–280°, after crystallization from aqueous isopropanol.

EXAMPLE 13

Example of a medicinal preparation: tablets

| | For every tablet, g. |
|---|---|
| N-(2-piperidinoethyl)-4-chloro-3-sulphamoyl-benzamide hydrochloride (compound of Example 2) | [1] 0.1115 |
| Magnesium stearate | 0.0010 |
| Stearic acid | 0.0020 |
| Polyvinyl-pyrrolidone | 0.0050 |
| Talcum | 0.0080 |
| Maize starch | 0.0140 |
| Lactose | 0.0285 |
| | 0.1700 |

[1] Corresponds to 0.10 g. of the free base.

The active compound is mixed with the magnesium stearate, polyvinyl-pyrrolidone, talcum, maize starch and lactose in dry state. The mixture is granulated with an alcoholic solution of the stearic acid and water and is pressed into tablets.

100 g. of tabletting mass theoretically yield 588 tablets, each weighing 0.170 g. and containing 100 g. of active compound.

What is claimed is:

1. A compound selected from the group consisting of a compound of formula:

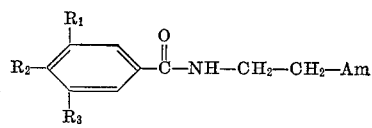

in which Am is 1-pyrrolidinyl, piperidino, 2,6-dimethyl-piperidino, 9-aza-9-bicyclo[3,3,1]nonyl, morpholino, 4-methyl-1-piperazinyl or 5-methyl-octahydro-1,5-diazocin-(1)-yl, and either (i) one of $R_1$, $R_2$ and $R_3$ is hydrogen, the second is hydrogen, fluorine, chlorine or methyl, and the third is sulphamoyl or nitro, or
(ii) one of $R_1$, $R_2$ and $R_3$ is hydrogen, and each of the remaining two is chlorine, and physiologically acceptable acid addition salts thereof.

2. N-(2-piperidinoethyl)-3,4-dichloro-benzamide.
3. N - (2-piperidinoethyl)-4-chloro-3-sulphamoyl-benzamide.
4. N - [2 - (1 - pyrrolidinyl) - ethyl] - 4 - chloro-3-sulphamoyl-benzamide.
5. N - (2 - morpholinoethyl) - 4 - chloro-3-sulphamoyl-benzamide.
6. N - [2 - (9 - aza - 9 - bicyclo[3,3,1]nonyl)-ethyl]-4-chloro-3-sulphamoyl-benzamide.
7. N-(2-piperidinoethyl)-4-sulphamoyl-benzamide.
8. N - [2 - (2,6 - dimethylpiperidino)-ethyl]-4-chloro-3-sulphamoyl-benzamide.
9. N - (2 - piperidinoethyl)-4-chloro-3-nitro-benzamide.
10. N - (2 - piperidinoethyl) - 4 - methyl-3-sulphamoyl-benzamide.
11. N - (2 - piperidinoethyl) - 4 - fluoro-3-sulphamoyl-benzamide.
12. N - [2 - (4-methyl-1-piperazinyl)-ethyl]-4-chloro-3-sulphamoyl-benzamide.
13. N - [2 - (5 - methyl - octahydro-1,5-diazocin-1-yl)-ethyl]-4-chloro-3-sulphamoyl-benzamide.

References Cited
UNITED STATES PATENTS 3,264,309   8/1966   Zenitz.

JAMES A. PATTEN, Primary Examiner

U.S. Cl. X.R.

260—326.3, 247.1, 293.4, 294, 268, 247.3, 292, 294.7, 293, 326.5, 326.62, 326.82, 247.7, 247.2, 518, 515, 141; 424—248, 250, 267, 274, 244